United States Patent
Uchida

(10) Patent No.: US 12,441,476 B2
(45) Date of Patent: Oct. 14, 2025

(54) CONTROL DEVICE FOR POWER CONSUMPTION MANAGEMENT OF ELECTRIC VTOL MOTOR

(71) Applicant: HONDA MOTOR CO., LTD., Tokyo (JP)

(72) Inventor: Kenta Uchida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 27 days.

(21) Appl. No.: 18/619,292

(22) Filed: Mar. 28, 2024

(65) Prior Publication Data

US 2024/0327006 A1    Oct. 3, 2024

(30) Foreign Application Priority Data

Mar. 29, 2023   (JP) ................. 2023-052652

(51) Int. Cl.
  *B64D 27/357*   (2024.01)
  *B64C 29/00*    (2006.01)
  *B64D 31/16*    (2024.01)

(52) U.S. Cl.
  CPC ........ *B64D 27/357* (2024.01); *B64C 29/0025* (2013.01); *B64D 31/16* (2024.01)

(58) Field of Classification Search
  CPC ...... B64D 27/35; B64D 27/357; B64D 31/16; B64D 31/18; B64C 29/0016; B64C 29/0025
  USPC ......................................... 244/228
  See application file for complete search history.

(56) References Cited

U.S. PATENT DOCUMENTS 10,131,426 B2   11/2018  Judas et al.
2009/0243522 A1 10/2009  Suhama et al.

FOREIGN PATENT DOCUMENTS

JP         4561616 B2   10/2010

*Primary Examiner* — Brady W Frazier
(74) *Attorney, Agent, or Firm* — Rankin, Hill & Clark LLP

(57) ABSTRACT

An electric power system of a flying object may supply power to electric loads including a VTOL motor and a cruise motor. A control device includes an acquisition unit, a determination unit that determines whether a power surplus situation in which surplus power obtained by deducting the required power from the sum of the generated power and the regenerated power is larger than the maximum allowable power is brought about, and a control unit that can execute power consumption increase control for increasing power consumption by reducing the operation efficiency of the cruise motor in the power surplus situation.

6 Claims, 6 Drawing Sheets

FIG. 2
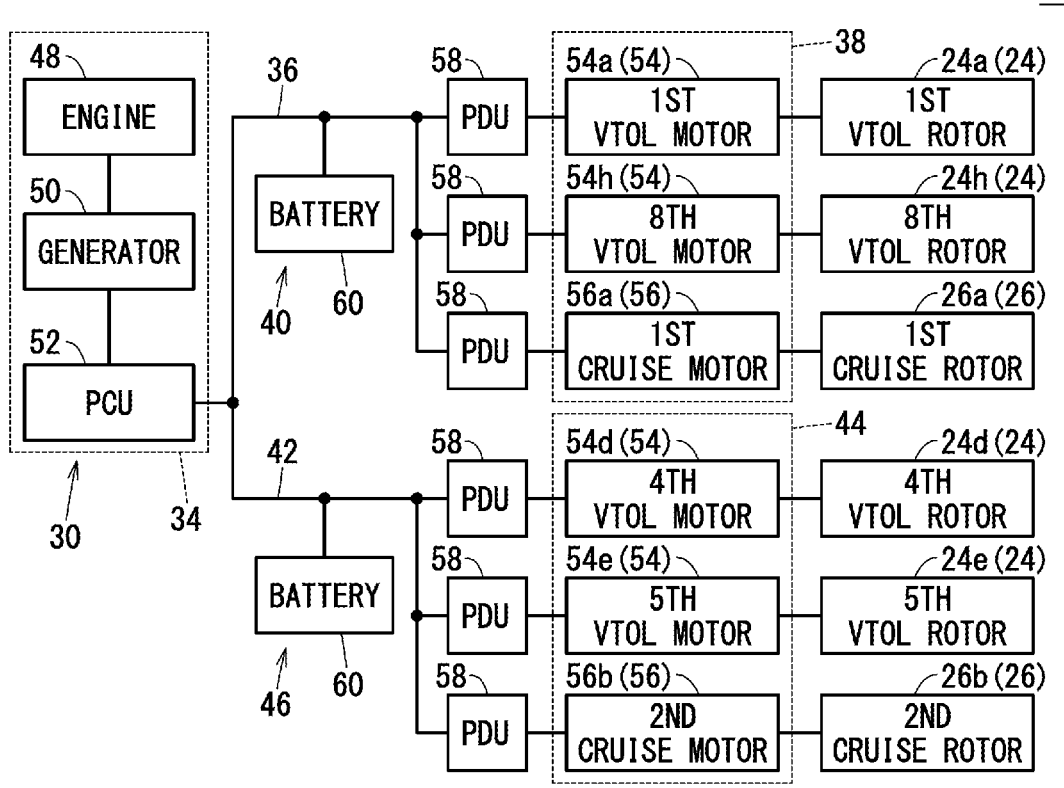
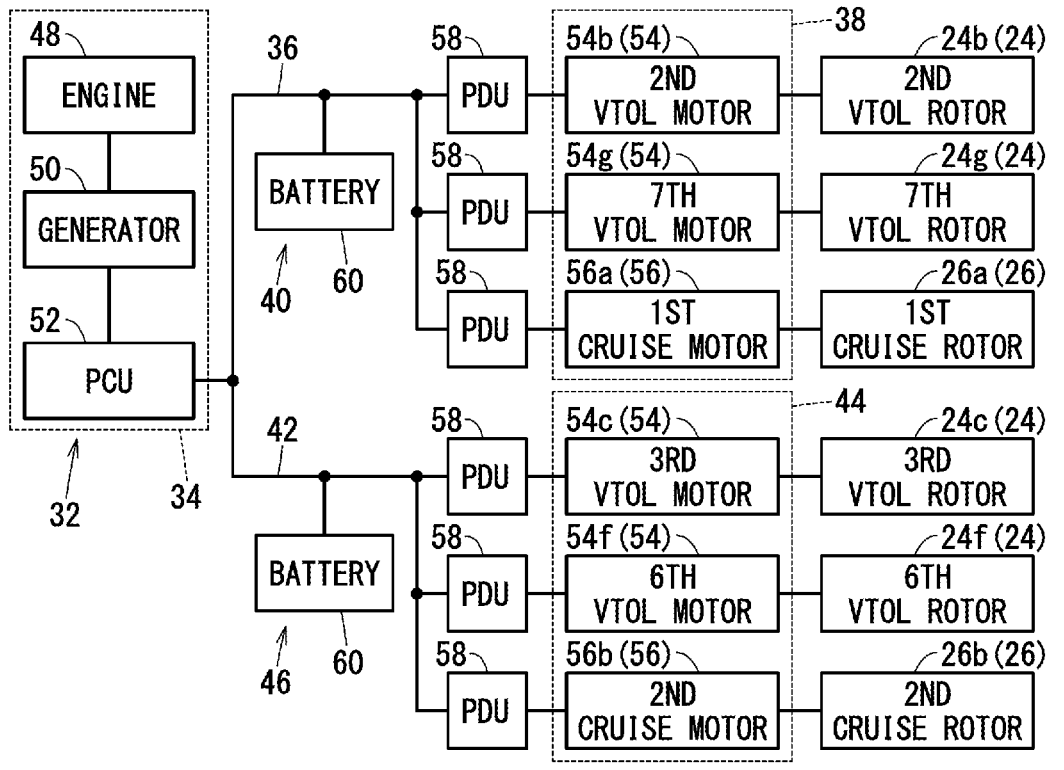

CONTROL DEVICE FOR POWER CONSUMPTION MANAGEMENT OF ELECTRIC VTOL MOTOR

CROSS-REFERENCE TO RELATED APPLICATIONS

This application is based upon and claims the benefit of priority from Japanese Patent Application No. 2023-052652 filed on Mar. 29, 2023, the contents of which are incorporated herein by reference.

BACKGROUND OF THE INVENTION

Field of the Invention

The present invention relates to a control unit and a flying object.

Description of the Related Art

In recent years, research and development have been conducted on electrification technology that contributes to energy efficiency in order to ensure that more people have access to affordable, reliable, sustainable and modern energy.

An electric power system of a flying object includes a generator driven by an internal combustion engine, a battery, a VTOL motor that drives VTOL rotors, and a cruise motor that drives cruise rotors (see, for example, U.S. Pat. No. 10,131,426 B2). The VTOL rotors generate an upward thrust on the flying object. The cruise rotors generate a horizontal thrust on the flying object.

SUMMARY OF THE INVENTION

To provide a control device and a flying object capable of excellently performing electric power control of the flying object.

An object of the present invention is to solve the above-described problems.

According to one aspect of the present invention, there is provided a control device configured to control a flying object equipped with an electric power system configured to supply electric power to electric loads including a vertical takeoff and landing motor that drives a vertical takeoff and landing rotor that generates an upward thrust on the flying object and a cruise motor that drives a cruise rotor that generates a horizontal thrust on the flying object, the electric power system including a generator that generates electric power by being driven by an engine, a power supply circuit configured to supply the electric power output from the generator to the electric loads, and a battery connected to the power supply circuit, the control device comprising: an acquisition unit configured to acquire information indicative of generated power generated by the generator, information indicative of regenerative power estimated to be supplied from the vertical takeoff and landing motor to the power supply circuit, information indicative of maximum allowable power that is a maximum amount of power allowable to be input to the battery and information indicative of required power expected to be consumed by the electric loads; a determination unit configured to determine whether a power surplus situation in which surplus power calculated by deducting the required power from a sum of the generated power and the regenerative power becomes greater than the maximum allowable power is brought about; and a control unit configured to execute power consumption increase control for increasing power consumption by reducing operation efficiency of the cruise motor in a case where the determination unit determines that the power surplus situation is going to be brought about.

Another aspect of the present invention is to provide a flying object including the control device described above.

According to the present invention, it is possible to provide a control device and a flying object capable of suitably performing power control of the flying object.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a configuration diagram of an electric power system;

DETAILED DESCRIPTION OF THE INVENTION

Figure 1:
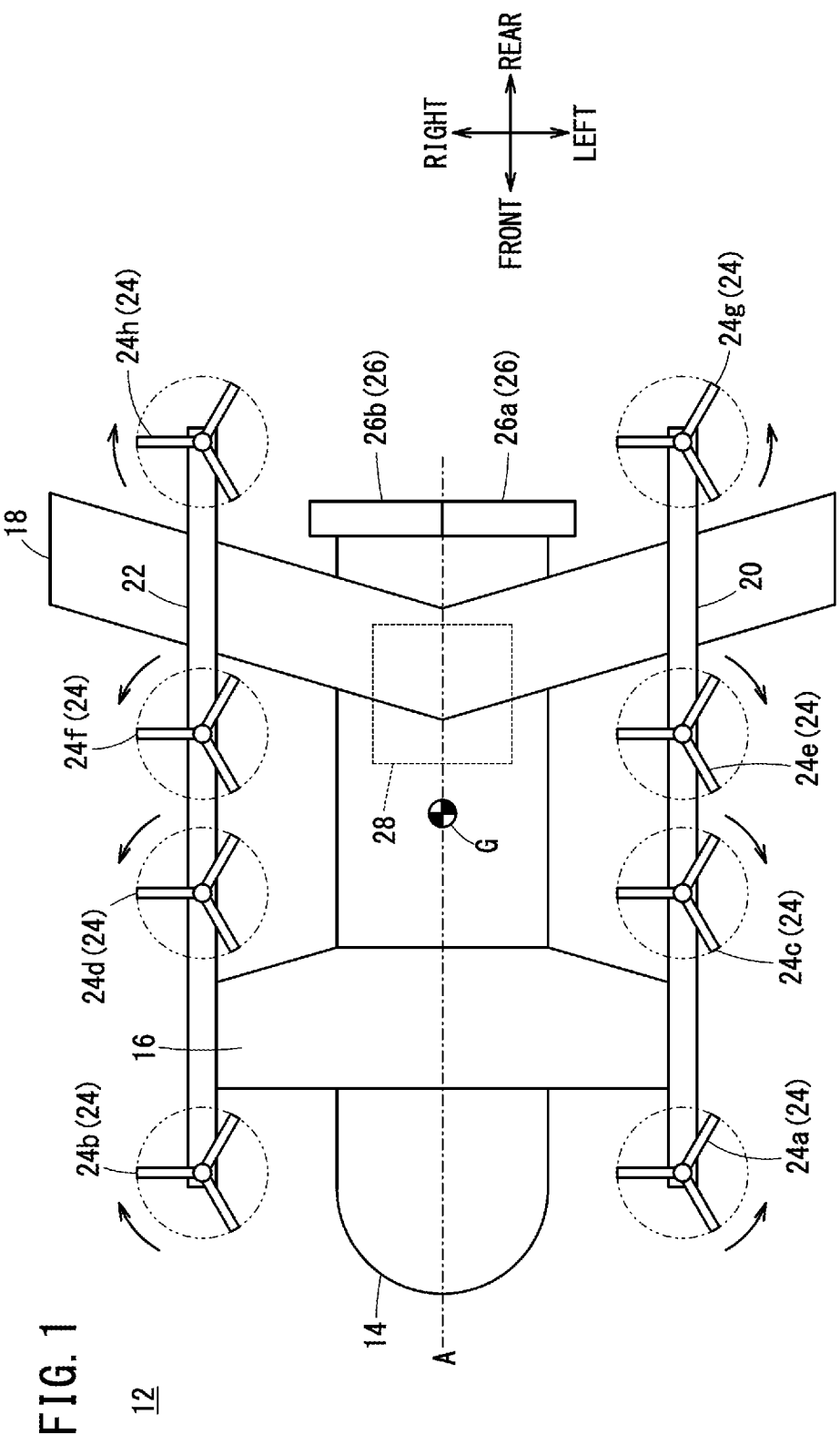
FIG. 1 is a schematic view of a flying object.

A control device 10 and a flying object 12 according to an embodiment of the present invention will be described below with reference to the drawings. As shown in FIG. 1, the flying object 12 according to the present embodiment is, for example, an electric vertical takeoff and landing (eVTOL) aircraft, but is not limited thereto. The flying object 12 is, for example, a hybrid aircraft.

The flying object 12 is equipped with a fuselage 14, a front wing 16, a rear wing 18, a left boom 20, a right boom 22, eight VTOL rotors 24, two cruise rotors 26, and an electric power system 28. The fuselage 14 extends in the front-rear direction.

The front wing 16 is attached to the fuselage 14 at a position forward of the center of gravity G of the fuselage 14. The rear wing 18 is attached to the fuselage 14 at a position rearward of the center of gravity G of the fuselage 14. Each of the left boom 20 and the right boom 22 extends in the front-rear direction of the fuselage 14. The left boom 20 connects the front wing 16 and the rear wing 18 on the left side of the center of gravity G of the fuselage 14. The right boom 22 connects the front wing 16 and the rear wing 18 in the right direction from the center of gravity G of the fuselage 14.

The VTOL rotors 24 generate an upward (vertically upward) thrust on the flying object 12. The VTOL rotors 24 are used at a time of transitioning from vertical takeoff to cruising, at a time of cruising, and at a time of transitioning from cruising to vertical landing.

The eight VTOL rotors 24 are arranged point-symmetrically with respect to the center of gravity G of the fuselage 14. In other words, the eight VTOL rotors 24 are disposed in line symmetry with respect to the center line A in the lateral direction of the fuselage 14. The eight VTOL rotors 24 are not necessarily arranged point-symmetrically with respect to the center of gravity G of the fuselage 14. The number, the position, and the like of the VTOL rotors 24 can be set as appropriate.

The eight VTOL rotors 24 are a first VTOL rotor 24a, a second VTOL rotor 24b, a third VTOL rotor 24c, a fourth VTOL rotor 24d, a fifth VTOL rotor 24e, a sixth VTOL rotor 24f, a seventh VTOL rotor 24g and an eighth VTOL rotor 24h. On the left boom 20, the first VTOL rotor 24a, the third VTOL rotor 24c, the fifth VTOL rotor 24e, and the seventh VTOL rotor 24g are arranged in this order from the front. On the right boom 22, the second VTOL rotor 24b, the fourth VTOL rotor 24d, the sixth VTOL rotor 24f, and the eighth VTOL rotor 24h are arranged in this order from the front.

The cruise rotors 26 generate a horizontal thrust on the flying object 12. The cruise rotors 26 are used at a time of transitioning from vertical takeoff to cruising, at a time of cruising, and at a time of transitioning from cruising to vertical landing. The cruise rotors 26 are provided at a rear end part of the fuselage 14.

The two cruise rotors 26 are a first cruise rotor 26a and a second cruise rotor 26b. The first cruise rotor 26a and the second cruise rotor 26b are arranged side by side in the lateral direction of the fuselage 14. The first cruise rotor 26a and the second cruise rotor 26b are arranged in line symmetry with respect to the center line A in the lateral direction of the fuselage 14.

The electric power system 28 is provided inside the fuselage 14. As shown in FIG. 2, the electric power system 28 includes a first propulsion system 30 and a second propulsion system 32. The first propulsion system 30 includes a power generation module 34, a first power supply circuit 36, a first electric load 38, a first electric power equipment 40, a second power supply circuit 42, a second electric load 44, and a second electric power equipment 46.

The power generation module 34 includes an engine 48, a generator 50, and a power control unit 52. Hereinafter, the power control unit 52 is referred to as "PCU 52". The engine 48 is, for example, a gas turbine engine, but is not limited thereto. The generator 50 is connected to the engine 48. The generator 50 generates power by being driven by the engine 48. The PCU 52 converts the three phase alternating current power input from the generator 50 into direct current power and outputs the direct current power.

The first power supply circuit 36 connects the power generation module 34 and the first electric load 38. The electric power generated by the generator 50 may be supplied to the first electric load 38 through the first power supply circuit 36. The first electric load 38 includes two VTOL motors 54 and one cruise motor 56. The first electric load 38 may also include an air conditioner for a cabin.

The VTOL rotors 24 are rotated by the VTOL motors 54. The VTOL motors 54 are three phase motors. One VTOL motor 54 is connected to each VTOL rotor 24. In the first electric load 38 of the first propulsion system 30, one of the two VTOL motors 54 is a first VTOL motor 54a connected to the first VTOL rotor 24a, and the other is the eighth VTOL motor 54h connected to the eighth VTOL rotor 24h.

The cruise rotors 26 are rotated by the cruise motors 56. The cruise motors 56 are three phase motors. Two cruise motors 56 are connected to each cruise rotor 26. Only one cruise motor 56 may be connected to each cruise rotor 26. In other words, the number of cruise motors 56 may be two in total, one for each of the left and right cruise rotors 26. In the first electric load 38 of the first propulsion system 30, the cruise motor 56 is the first cruise motor 26a connected to a first cruise rotor 56a.

The first electric power equipment 40 is provided in the first power supply circuit 36. The first electric power equipment 40 includes three power drive units 58 and one battery 60. Hereinafter, the power drive unit 58 is referred to as the PDU 58.

The three PDUs 58 are connected to two VTOL motors 54 and one cruise motor 56, respectively. The three PDUs 58 are connected in parallel with each other. The PDU 58 includes a plurality of switching elements. Examples of the switching element include an insulated gate bipolar transistor (IGBT), a metal oxide semiconductor field-effect transistor (MOSFET) and the like. The PDU 58 is a power conversion device including an electric circuit capable of converting direct current power into alternating current power and vice versa. That is, the PDU 58 has a function of converting direct current power into alternating current power and a function of converting alternating current power into direct current power.

The PDU 58 connected to the first VTOL motor 54a converts the direct current power supplied via the first power supply circuit 36 into three phase alternating current power and outputs the three phase alternating current power to the first VTOL motor 54a while the first VTOL motor 54a is being driven. The PDU 58 connected to the eighth VTOL motor 54h converts the direct current power supplied via the first power supply circuit 36 into three phase alternating current power and outputs the three phase alternating current power to the eighth VTOL motor 54h while the eighth VTOL motor 54h is being driven. The PDU 58 connected to the first VTOL motor 54a also converts the three phase alternating current power from the first VTOL motor 54a into direct current power and supplies the direct current power to the first power supply circuit 36 while the first VTOL motor 54a is regenerating power. The PDU 58 connected to the eighth VTOL motor 54h also converts the three phase alternating current power from the eighth VTOL motor 54h into direct current power and supplies the direct current power to the first power supply circuit 36 while the eighth VTOL motor 54h is regenerating power. The PDU 58 connected to the first cruise motor 56a converts the direct current power supplied via the first power supply circuit 36 into three phase alternating current power and outputs the three phase alternating current power to the first cruise motor 56a while the first cruise motor 56a is being driven.

The battery 60 is connected in parallel with the three PDUs 58. The battery 60 stores electric power supplied via the first power supply circuit 36. The battery 60 supplies electric power to the first power supply circuit 36 as necessary.

The second power supply circuit 42 connects the power generation module 34 and the second electric load 44. The electric power generated by the generator 50 may be supplied to the second electric load 44 through the second power supply circuit 42. The second power supply circuit 42 is connected to the first power supply circuit 36. The second electric load 44 is constituted in the same manner as the first electric load 38. Therefore, the detailed description of the configuration of the second electric load 44 will be omitted.

In the second electric load 44 of the first propulsion system 30, one of the two VTOL motors 54 is a fourth VTOL motor 54d connected to the fourth VTOL rotor 24d, and the other is a fifth VTOL motor 54e connected to the fifth VTOL rotor 24e. In the second electric load 44 of the first propulsion system 30, the cruise motor 56 is a second cruise motor 56b connected to the second cruise rotor 26b.

The second electric power equipment 46 is provided in the second power supply circuit 42. The second electric power equipment 46 is configured in the same manner as the first electric power equipment 40. Therefore, the detailed description of the configuration of the second electric power equipment 46 will be omitted.

The second propulsion system 32 is configured in the same manner as the first propulsion system 30. Therefore, a detailed description of the configuration of the second propulsion system 32 will be omitted.

In the first electric load 38 of the second propulsion system 32, one of the two VTOL motors 54 is a second VTOL motor 54b connected to the second VTOL rotor 24b, and the other is a seventh VTOL motor 54g connected to the seventh VTOL rotor 24g. In the first electric load 38 of the second propulsion system 32, the cruise motor 56 is the first cruise motor 56a connected to the first cruise rotor 26a.

In the second electric load 44 of the second propulsion system 32, one of the two VTOL motors 54 is a third VTOL motor 54c connected to the third VTOL rotor 24c, and the other is a sixth VTOL motor 54f connected to the sixth VTOL rotor 24f. In the second electric load 44 of the second propulsion system 32, the cruise motor 56 is a second cruise motor 56b connected to the second cruise rotor 26b.

The combinations of the VTOL rotors 24 and the cruise rotors 26 in the first electric load 38 and the second electric load 44 can be changed as desired. The power generation module 34 may be provided separately for the first power supply circuit 36 and the second power supply circuit 42. In this case, the electric power system 28 includes four power generation modules 34.

Although not shown, the electric power system 28 includes, for example, a switch, a resistor, a coil, a capacitor, various sensors, a fuse, a relay, a breaker, a pre-charge circuit, a DC-DC converter, and the like, in addition to the above-described components.

Figure 3:
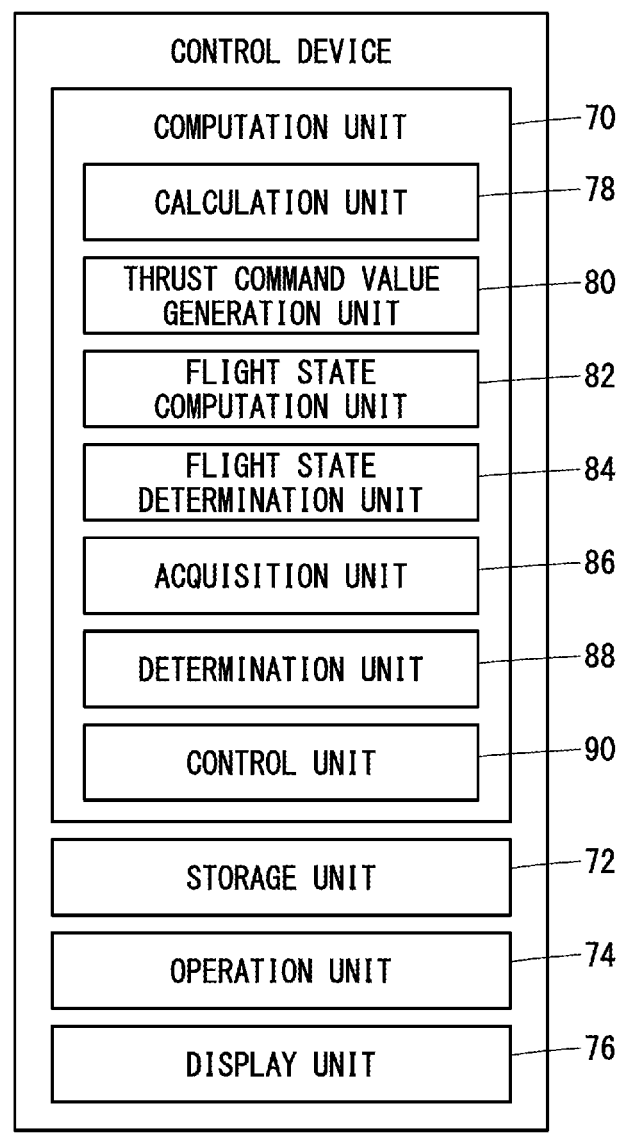
FIG. 3 is a block diagram showing a control device.

As shown in FIG. 3, the flying object 12 includes the control device 10 that controls the driving of the flying object 12. The control device 10 includes a computation unit 70, a storage unit 72, an operation unit 74, and a display unit 76. The computation unit 70 can be constituted by a processor such as a CPU (Central Processing Unit), a GPU (Graphics Processing Unit), or the like. More specifically, the computation unit 70 can be constituted by a processing circuit (processing circuitry).

The computation unit 70 includes a calculation unit 78, a thrust command value generation unit 80, a flight state computation unit 82, a flight state determination unit 84, an acquisition unit 86, a determination unit 88, and a control unit 90. The calculation unit 78, the thrust command value generation unit 80, the flight state computation unit 82, the flight state determination unit 84, the acquisition unit 86, the determination unit 88, and the control unit 90 can be realized by the computation unit 70 executing a program stored in the storage unit 72. At least a portion of the calculation unit 78, the thrust command value generation unit 80, the flight state computation unit 82, the flight state determination unit 84, the acquisition unit 86, the determination unit 88, and the control unit 90 may be provided in another control device separate from the control device 10.

Moreover, at least a portion of the calculation unit 78, the thrust command value generation unit 80, the flight state computation unit 82, the flight state determination unit 84, the acquisition unit 86, the determination unit 88, and the control unit 90 may be realized by an integrated circuit such as an ASIC (Application Specific Integrated Circuit) or an FPGA (Field-Programmable Gate Array) or the like. Further, at least a portion of the calculation unit 78, the thrust command value generation unit 80, the flight state computation unit 82, the flight state determination unit 84, the acquisition unit 86, the determination unit 88, and the control unit 90 may be constituted by an electronic circuit including a discrete device.

The storage unit 72 may be made up of a volatile memory (not shown), and a non-volatile memory (not shown). As the volatile memory, there may be cited, for example, a RAM (Random Access Memory). Such a volatile memory is used as a working memory of the processor, and temporarily stores data necessary for performing processing or calculations. As the nonvolatile memory, there may be cited, for example, a ROM (Read Only Memory), a flash memory, or the like. The nonvolatile memory is used as a storage memory, and stores programs, tables, maps, and the like. At least part of the storage unit 72 may be provided in the processor, the integrated circuit, etc. as described above.

The operation unit 74 is mounted, for example, in a non-illustrated cockpit of the flying object 12. The operation unit 74 is operated by a pilot. The operation unit 74 includes a control stick, a switch, and the like, but is not limited thereto.

The display unit 76 includes a non-illustrated display element. As the display element, for example, a liquid crystal display element, an organic electroluminescence display element, or the like is used. The operation unit 74 and the display unit 76 may be configured by a non-illustrated touch panel including such a display element.

The calculation unit 78 calculates a flight command value and the like for the flying object 12. The thrust command value generation unit 80 generates a thrust command value for each VTOL rotor 24 and a thrust command value for each cruise rotor 26 based on the flight command value. The flight state computation unit 82 computes the flight state of the flying object 12. The flight state determination unit 84 determines whether or not the flight state computed by the flight state computation unit 82 falls within a predetermined acceptable range. The acquisition unit 86 acquires various kinds of information. The determination unit 88 determines whether or not the system is in a predetermined electric power state. The control unit 90 controls the PDUs 58.

Next, control of the flying object 12 by the control device 10 according to the present embodiment will be described with reference to FIGS. 4 to 6. Here, the control of the flying object 12 in transitioning from a vertical takeoff state to a cruise state will be described. In the vertical takeoff state, for example, eight VTOL rotors 24 are driven and two cruise rotors 26 are not driven. Here, exemplified is a case where the first VTOL rotor 24a and the eighth VTOL rotor 24h are appropriately stopped and the two cruise rotors 26 are driven in transitioning from vertical takeoff to cruising.

The VTOL rotors 24 to be stopped are not limited to the first VTOL rotor 24a and the eighth VTOL rotor 24h. However, it is preferable to stop a pair of VTOL rotors 24 positioned point-symmetrically with respect to the center of gravity G of the flying object 12 because the balance of the attitude of the flying object 12 is less likely to be lost.

Figure 4:
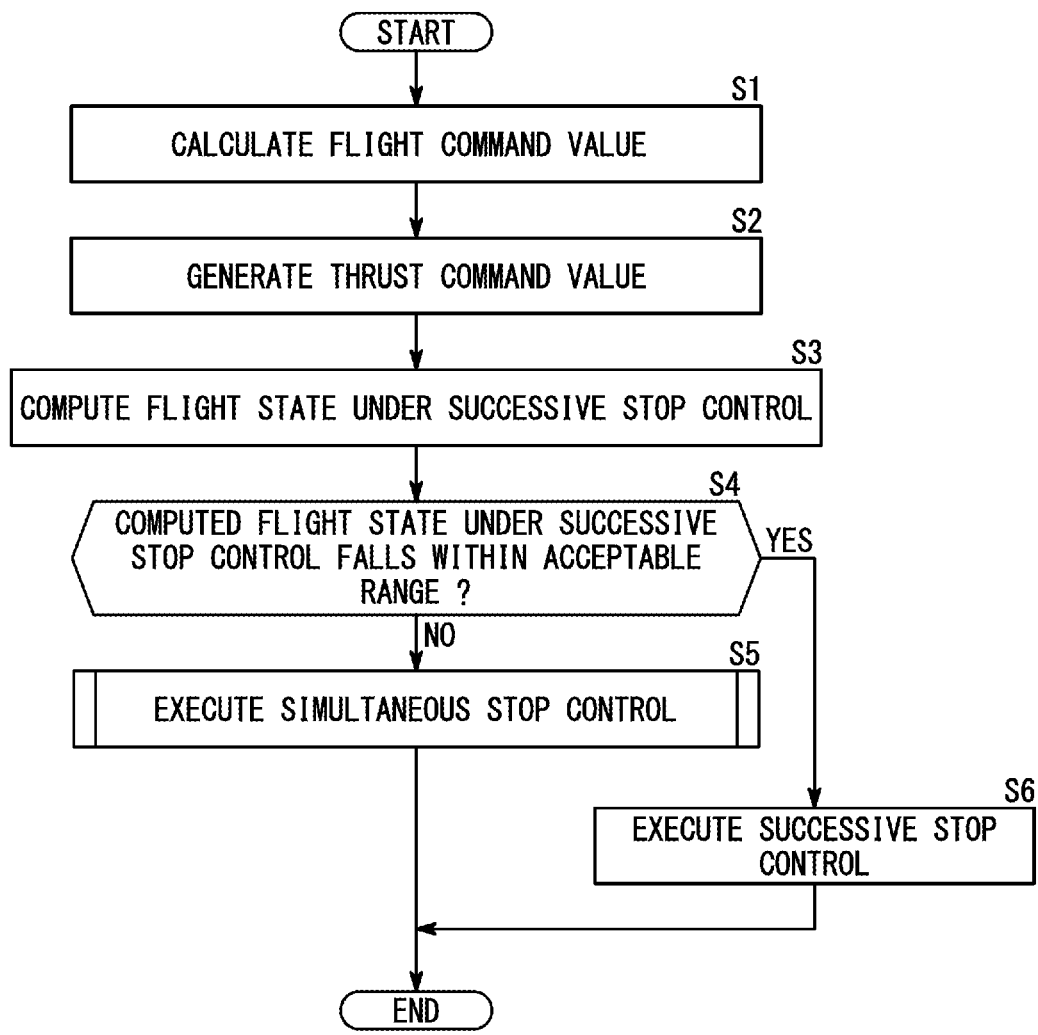
FIG. 4 is a flowchart showing control of the flying object.

In step S1 of FIG. 4, the calculation unit 78 calculates the flight command value indicating the flight state of the flying object 12 based on the information input to the operation unit 74. The flight command value is an attitude command value indicating the attitude of the flying object 12. The flight command value is not limited to the attitude command value, and may be a command value indicating the speed of the flying object 12 or a command value indicating the acceleration of the flying object 12. The process then proceeds to step S2.

In step S2, the thrust command value generation unit 80 generates a thrust command value for each VTOL rotor 24 and a thrust command value for each cruise rotor 26 based on the flight command value. Here, since the first VTOL rotor 24a and the eighth VTOL rotor 24h are stopped, the thrust command value for each of the first VTOL rotor 24a and the eighth VTOL rotor 24h becomes zero. The process then proceeds to step S3.

In step S3, the flight state computation unit 82 computes the flight state of the flying object 12 in the case of successive stop control. Here, the successive stop control refers to control for stopping a plurality of VTOL rotors 24 one by one. That is, in step S3, the flight state computation unit 82 computes the attitude of the flying object 12 on the premise of stopping the first VTOL rotor 24a and subsequently stopping the eighth VTOL rotor 24h.

In step S3, the flight state computation unit 82 may compute the flight state of the flying object 12 on the premise of adjusting rotational speeds of the VTOL rotors 24 that are not to be stopped. That is, the flight state computation unit 82 may compute the attitude of the flying object 12 based on the premise of, for example, stopping the first VTOL rotor 24a and reducing the rotational speed of the second VTOL rotor 24b. Further, the flight state computation unit 82 may compute the attitude of the flying object 12 based on the premise of, for example, stopping the eighth VTOL rotor 24h and reducing the rotational speed of the seventh VTOL rotor 24g. The process then proceeds to step S4.

In step S4, the flight state determination unit 84 determines whether or not the flight state computed by the flight state computation unit 82 falls within a predetermined acceptable range. That is, the flight state determination unit 84 determines whether or not the computed flight state under the successive stop control is within the predetermined acceptable range. For example, the flight state determination unit 84 determines whether or not the computed attitude of the flying object 12 in the case of stopping the first VTOL rotor 24a and subsequently stopping of the eighth VTOL rotor 24h is within the acceptable range. If the computed flight state is not within the predetermined acceptable range (step S4: NO), the process proceeds to step S5. If the computed flight state is within the predetermined acceptable range (step S4: YES), the process proceeds to step S6.

In step S5, the control unit 90 executes simultaneous stop control. Here, the simultaneous stop control refers to control for simultaneously stopping the plurality of VTOL rotors 24. That is, the simultaneous stop control of step S5 is, for example, control for simultaneously stopping the first VTOL rotor 24a and the eighth VTOL rotor 24h. In this case, the process proceeds to step S7 in FIG. 5.

In step S7, the acquisition unit 86 acquires generated power information, regenerative power information, battery information, and power consumption information. As shown in FIG. 6, the generated power information indicates generated power P1 generated by the generator 50 in the first propulsion system 30.

The regenerative power information indicates regenerative power expect to be supplied from the VTOL motors 54 to the first power supply circuit 36 when the VTOL motors 54 are controlled such that the maximum regenerative torque is generated in the VTOL rotors 24 in the first propulsion system 30. That is, the regenerative power information indicates the total regenerative power of the expected regenerative power P2 supplied from the first VTOL motor Tr to the first power supply circuit 36 and the expected regenerative power P3 supplied from the eighth VTOL motor 54h to the first power supply circuit 36 when the first VTOL motor 54a and the eighth VTOL motor 54h are controlled such that the maximum regenerative torque is generated in the first VTOL rotor 24a and the eighth VTOL rotor 24h.

The battery information indicates the maximum allowable power that is a maximum amount of power supplied to the battery 60 in the first propulsion system 30. As the maximum allowable power, an unoccupied capacity and a maximum charge rate may be taken into consideration. The unoccupied capacity is calculated by deducting an unoccupied capacity from a full capacity of the battery 60. More specifically, the maximum allowable power takes the total power capacity obtained by adding unoccupied capacities of all the batteries 60 in the first propulsion system 30 into consideration. The acquisition unit 86 acquires the unoccupied capacity based on an output signal from each battery 60.

The maximum charge rate indicates the maximum amount of power supplied to the battery 60 per unit time. The maximum charge rate is a numerical value determined in advance according to specifications of the battery 60, and is stored in the storage unit 72. The acquisition unit 86 acquires the maximum charge rate stored in the storage unit 72.

The power consumption information is information indicating power consumption, which is energy expected to be consumed by the first electric load 38 and the second electric load 44 in the first propulsion system 30. The power consumption corresponds to required power P4 to P7. The required power P4 is power required for driving the first cruise motor 56a of the first propulsion system 30 optimally. The required power P5 is power required for driving the fourth VTOL motor 54d of the first propulsion system 30 optimally. The required power P6 is power required for driving the fifth VTOL motor 54e of the first propulsion system 30 optimally. The required power P7 is power required for driving the second cruise motor 56b of the first propulsion system 30 optimally. After step S7, the process proceeds to step S8.

The operation efficiency of the VTOL motors 54 can be obtained from a graph or the like showing the relationship between the current phase of the motor current and the output torque. The same applies to the operation efficiency of the cruise motors 56. The operation efficiency of the motors can be controlled by using, for example, a method described in JP 4561616 B2.

In step S8, the determination unit 88 determines whether or not a power surplus situation is brought about. Here, the power surplus situation is a situation in which surplus power P8 obtained by deducting the required power P4 to P7 from the sum of the generated power P1 and the regenerative power P2, P3 is larger than the maximum allowable power. When the determination unit 88 determines that the power surplus situation is not brought about (step S8: NO), the process proceeds to step S9. When the determination unit 88 determines that the power surplus situation is brought about (step S8: YES), the process proceeds to step S10.

In step S9, the control unit 90 executes normal stop control. That is, the control unit 90 controls the first VTOL motor 24a such that the regenerative torque generated in the first VTOL rotor 24a becomes maximum, and controls the eighth VTOL motor 24h such that the regenerative torque generated in the eighth VTOL rotor 24h becomes maximum. Thus, the first VTOL rotor 24a and the eighth VTOL rotor 24h can be efficiently stopped at the same time. The battery 60 stores energy generated by surplus supply of the regenerative power P2 from the first VTOL motor 54a and the regenerative power P3 from the eighth VTOL motor 54h.

Figure 5:
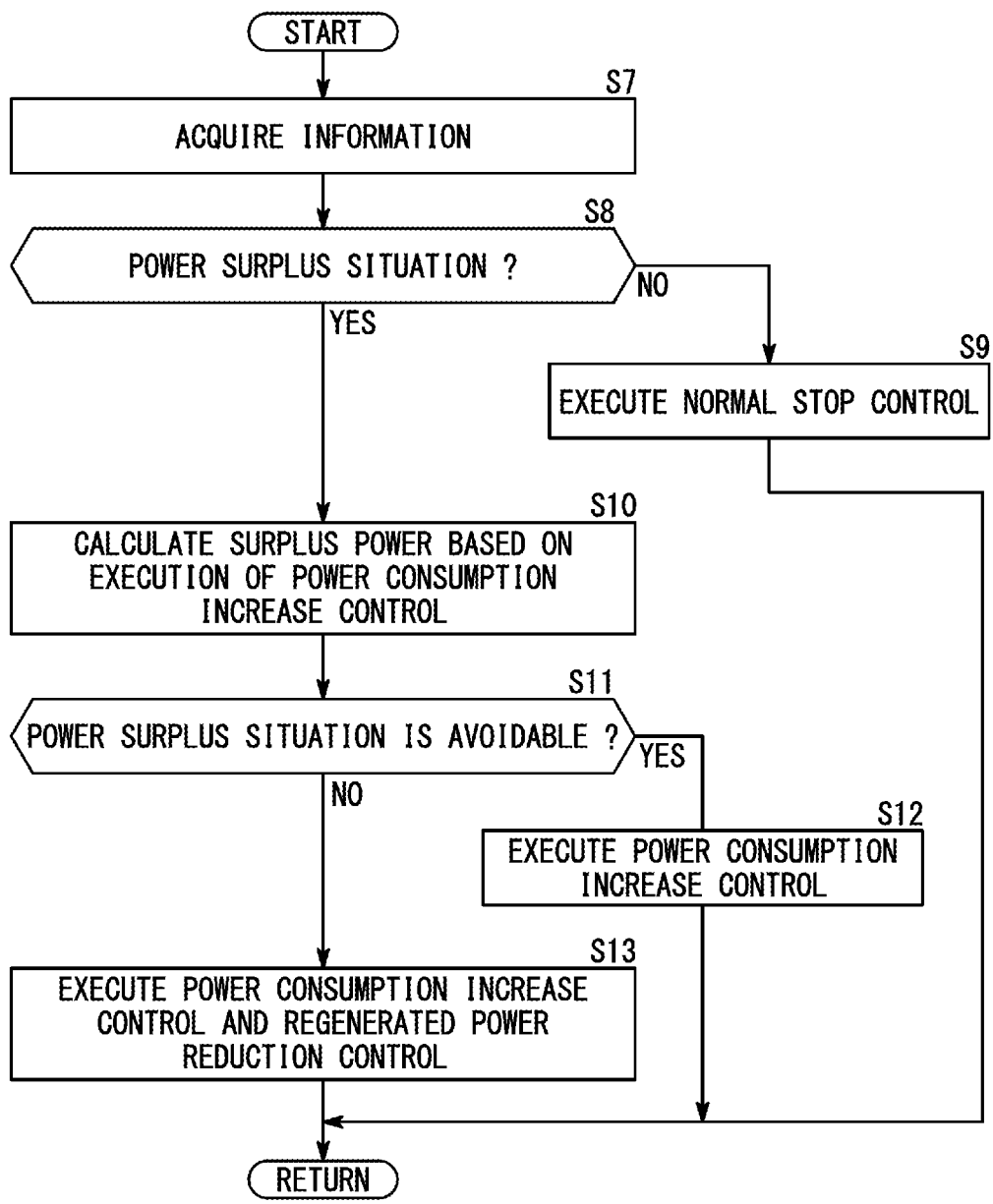
FIG. 5 is a flowchart for describing simultaneous stop control.
Figure 6:
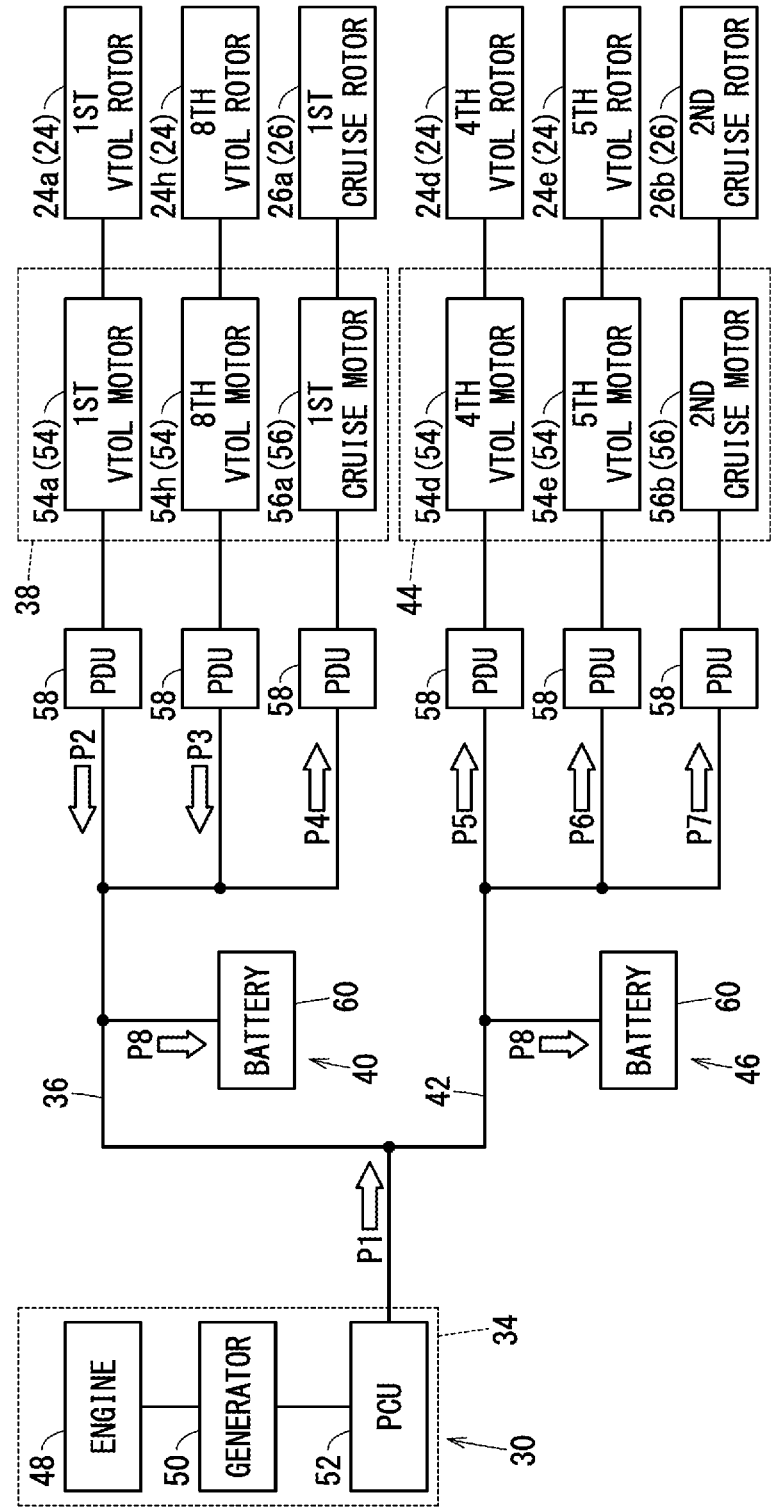
FIG. 6 is a diagram illustrating electric power flow of the simultaneous stop control.

Then, the process shown in FIG. 5 is completed, and also the process of FIG. 4 is completed.

In step S10, the calculation unit 78 calculates the surplus power P8 based on the premise that the power consumption increase control is executed. The power consumption increase control is a control for increasing the power consumption by reducing the operation efficiency of the cruise motors 56. In other words, in the power consumption increase control, in the first propulsion system 30, the required power P4 is increased by reducing the operating efficiency of the first cruise motor 56a, and the required power P7 is increased by reducing the operating efficiency of the second cruise motor 56b. That is, in the power consumption increase control, the control unit 90 controls the operation of the PDUs 58 to reduce the operation efficiency of the first cruise motor 56a and the second cruise motor 56b. In the power consumption increase control, the operation efficiency of only one of the first cruise motor 56a and the second cruise motor 56b may be reduced in the first propulsion system 30. The process then proceeds to step S11.

In step S11, the determination unit 88 determines whether or not the power surplus situation can be defused only by performing the power consumption increase control. That is, the determination unit 88 determines that the power surplus situation cannot be defused only by performing the power consumption increase control when the surplus power P8 calculated by the calculation unit 78 is still larger than the maximum allowable power to the batteries, and determines that the power surplus situation can be defused only by performing the power consumption increase control when the surplus power P8 calculated by the calculation unit 78 is equal to or smaller than the maximum allowable power to the batteries. When the determination unit 88 determines that the power surplus situation can be defused only by the power consumption increase control (step S11: YES), the process proceeds to step S12. When the determination unit 88 determines that the power surplus situation connect be defused only by the power consumption increase control (step S11: NO), the process proceeds to step S13.

In step S12, the control unit 90 executes power consumption increase control. Thus, the surplus power P8 is reduced, and hence it is possible to prevent the electric power larger than the maximum allowable power from being input to the battery 60. Further, the first cruise motor 56a and the second cruise motor 56b generate more heat than when the power consumption increase control is not executed. Therefore, the first cruise rotor 26a and the second cruise rotor 26b can be efficiently warmed up. Then, the process shown in FIG. 5 is completed, and also the process of FIG. 4 is completed.

In step S13, the control unit 90 executes the power consumption increase control and the regenerative power reduction control. Here, the regenerative power reduction control reduces power regeneration by increasing the power dissipation in the VTOL motors 54. In other words, the regenerative power reduction control reduces the regenerative power P2 supplied from the first VTOL motor 54a to the first power supply circuit 36 and the regenerative power P3 supplied from the eighth VTOL motor 54h to the first power supply circuit 36. That is, the control unit 90 increases the power dissipation in the first VTOL motor 54a and the eighth VTOL motor 54h by appropriately controlling the operation of the PDUs 58. In the regenerative power reduction control, the regenerative power of only one of the first VTOL motor 54a and the eighth VTOL motor 54h may be reduced.

According to the process of step S13, the generation of the surplus power P8 is further suppressed by reducing the regenerative power P2, P3, and thus it is possible to suppress the electric power larger than the maximum allowable power from being input to the battery 60.

In step S13, the required power P5, P6 may be increased by reducing the operating efficiency of at least one of the fourth VTOL motor 54d and the fifth VTOL motor 54e, as necessary. Then, the process shown in FIG. 5 is completed, and also the process of FIG. 4 is completed.

In step S6 of FIG. 4, the control unit 90 executes the successive stop control. That is, the control unit 90 controls the operation of the PDU 58 to control the first VTOL motor 54a to stop supplying electric power to the first VTOL rotor 24a, and then controls the PDU 58 to control the eighth VTOL motor 54h to stop supplying electric power to the eight VTOL rotor 24h. In this case, unlike the simultaneous stop control, the regenerative power P2 and the regenerative power P3 are not supplied at the same time, and thus it is possible to suppress electric power larger than the maximum allowable power from being input to the battery 60. Then, the process shown in FIG. 4 is completed.

In the present embodiment, the number of VTOL motors 54 to be stopped may be one or three or more. In addition, when the plurality of VTOL motors 54 are stopped, the combination of the VTOL motors 54 to be stopped can be appropriately set. Furthermore, the present embodiment is not limited to the example in which the plurality of VTOL rotors 24 are stopped, and can be applied to a case in which the plurality of VTOL rotors 24 are decelerated.

According to the present embodiment, the power consumption increase control is executed when the power surplus situation is predicted, and thus it is possible to suppress the power larger than the maximum allowable power from being input to the battery 60. The power consumption increase control increases the power consumption by reducing the operation efficiency of the cruise motors 56, and thus the cruise rotors 26 can be warmed up by the heat generated by the cruise motors 56. As described above, according to the present embodiment, the power management of the aircraft can be suitably performed.

In relation to the above-described disclosure, the following supplementary notes are further disclosed.

Supplementary Note 1

The control device (10) configured to control a flying object (12) equipped with the electric power system (28) configured to supply electric power to electric loads (38, 44) including the vertical takeoff and landing motor (54) that drives the vertical takeoff and landing rotor (24) that generates an upward thrust on the flying object and the cruise motor (56) that drives the cruise rotor (26) that generates a horizontal thrust on the flying object, the electric power system including the generator (50) configured to generate electric power by being driven by the engine (48), the power supply circuit (36, 42) configured to supply the electric power output from the generator to the electric loads, and the battery (60) connected to the power supply circuit, the control device comprising: the acquisition unit (86) configured to acquire information indicative of generated power (P1) the generator generates, information indicative of regenerative power (P2, P3) expected to be supplied from the vertical takeoff and landing motor to the power supply circuit, information indicative of maximum allowable power that is a maximum amount of power allowable to be input to the battery and information indicative of required power (P4 to P7) expected to be consumed by the electric loads; the determination unit (88) configured to determine whether a power surplus situation in which surplus power (P8) calculated by deducting the required power from a sum of the generated power and the regenerative power becomes greater than the maximum allowable power is brought about; and the control unit (90) configured to execute power consumption increase control for increasing power consumption by reducing operation efficiency of the cruise motor in a case where the determination unit determines that the power surplus situation is going to be brought about.

According to such a configuration, the power consumption increase control can be executed when the power surplus situation is foreseen, and thus it is possible to suppress power larger than the maximum allowable power from being input to the battery. In the power consumption increase control, the power consumption is increased by reducing the operation efficiency of the cruise motors, and thus the cruise rotors can be warmed up by the heat generated by the cruise motors. In this way, the power management of the aircraft can be suitably performed.

Supplementary Note 2

In the control device according to Supplementary Note 1, the regenerative power may be electric power expected to be supplied from the VTOL motor to the power supply circuit at a time when the VTOL motor stops driving.

According to such a configuration, it is possible to stop the VTOL motor while suppressing power larger than the maximum allowable power from being input to the battery.

Supplementary Note 3

In the control device according to Supplementary Note 2, the electric loads may include a plurality of the VTOL motors, and the control device may include the flight state computation unit (82) configured to compute a flight state of the flying object in the case of successive stop control of stopping the plurality of VTOL motors one by one is to be performed; and the flight state determination unit (84) configured to determine whether the flight state computed by the flight state computation unit falls within a predetermined acceptable range, and the control unit executes the successive stop control in a case where the flight state determination unit determines that the flight state falls within the acceptable range, and executes simultaneous stop control of stopping the plurality of VTOL motors simultaneously in a case where the flight state determination unit determines that the flight state does not fall within the acceptable range.

According to such a configuration, the successive stop control can be executed when the flight state is within the acceptable range. Thus, the plurality of VTOL motors can be stopped without reducing the operation efficiency of the VTOL motors and the cruise motors. Therefore, it is possible to relatively reduce wasted electric power. Further, the simultaneous stop control can be executed when the flight state is not within the acceptable range. Thus, the plurality of VTOL motors can be reliably stopped while the flight state is maintained in the acceptable range.

Supplementary Note 4

In the control device according to Supplementary Note 3, the control unit may perform power consumption increase control in a case of executing the simultaneous stop control.

According to such a configuration, it is possible to stop the plurality of VTOL motors while suppressing power larger than the maximum allowable power from being input to the battery.

Supplementary Note 5

In the control device according to the supplementary note 1, the determination unit may determine whether the power surplus situation can be defused only by executing power consumption increase control, and the control unit may execute regenerative power reduction control for reducing the regenerative power by increasing power dissipation in at least one of the plurality of VTOL motors when the determination unit determines that the power surplus situation cannot be defused only by executing the power consumption increase control.

According to such a configuration, it is possible to further suppress electric power larger than the maximum allowable power from being input to the battery.

Supplementary Note 6

A flying object (12) includes the control device according to any one of Supplementary Notes 1 to 5.

Moreover, it should be noted that the present invention is not limited to the embodiments described above, but a variety of configurations may be adopted therein without departing from the essence and gist of the present invention.

The invention claimed is:

1. A control device configured to control a flying object equipped with an electric power system configured to supply electric power to electric loads including a vertical takeoff and landing motor that drives a vertical takeoff and landing rotor that generates an upward thrust on the flying object and a cruise motor that drives a cruise rotor that generates a horizontal thrust on the flying object, wherein the electric power system comprises:
  a generator configured to generate electric power by being driven by an engine;
  a power supply circuit configured to supply the electric power output from the generator to the electric loads; and
  a battery connected to the power supply circuit;

wherein the control device comprises one or more processors that execute computer-executable instructions stored in a memory, wherein the one or more processors execute the computer-executable instructions to cause the control device to:
  acquire information indicative of generated power the generator generates, information indicative of regenerative power expected to be supplied from the vertical takeoff and landing motor to the power supply circuit, information indicative of maximum allowable power that is a maximum amount of power allowable to be input to the battery and information indicative of required power expected to be consumed by the electric loads;
  determine whether a power surplus situation in which surplus power calculated by deducting the required power from a sum of the generated power and the regenerative power becomes greater than the maximum allowable power is brought about; and
  enable execution of power consumption increase control for increasing power consumption by reducing operation efficiency of the cruise motor in a case where the power surplus situation is determined to be brought about.

2. The control device according to claim 1, wherein the regenerative power is electric power expected to be supplied from the vertical takeoff and landing motor to the power supply circuit at a time when the vertical takeoff and landing motor stops driving.

3. The control device according to claim 2, wherein
the electric loads comprise a plurality of the vertical takeoff and landing motors, and
the one or more processors cause the control device to:
compute a flight state of the flying object in a case of successive stop control of stopping driving of the plurality of vertical takeoff and landing motors one by one; and
determine whether the flight state as computed falls within a predetermined acceptable range, and
execute the successive stop control in a case where the flight state within the acceptable range is determined, and execute simultaneous stop control of stopping driving of the plurality of vertical takeoff and landing motors simultaneously in a case where the flight state outside the acceptable range is determined.

4. The control device according to claim 3, wherein the one or more processors cause the control device to:
enable the power consumption increase control to be executed in a case of executing the simultaneous stop control.

5. The control device according to claim 1, wherein
the one or more processors cause the control device to:
determine whether the power surplus situation is defused only by executing the power consumption increase control, and
enable regenerative power reduction control for reducing the regenerative power to be executed by increasing power dissipation in at least one of plurality of the vertical takeoff and landing motors in a case where the power surplus situation is determined not to be defused only by executing the power consumption increase control.

6. A flying object comprising the control device according to claim 1.

* * * * *